United States Patent [19]

Kanaan

[11] Patent Number: 5,314,198

[45] Date of Patent: * May 24, 1994

[54] COLLET CHUCK APPARATUS

[75] Inventor: Roger J. Kanaan, Easley, S.C.

[73] Assignee: Jacobs Chuck Technology, Wilmington, Del.

[ * ] Notice: The portion of the term of this patent subsequent to Mar. 16, 2010 has been disclaimed.

[21] Appl. No.: 992,260

[22] Filed: Dec. 14, 1992

Related U.S. Application Data

[63] Continuation of Ser. No. 770,355, Oct. 3, 1991, Pat. No. 5,193,825.

[51] Int. Cl.⁵ .................. B23B 31/20; B23B 31/36
[52] U.S. Cl. ........................ 279/133; 279/46.7; 279/48
[58] Field of Search .............. 279/42, 43.7, 43.8, 279/43.9, 46.7, 46.8, 46.9, 47-50, 52, 54-57, 59

[56] References Cited

U.S. PATENT DOCUMENTS

| | | | |
|---|---|---|---|
| 2,346,706 | 4/1944 | Stoner | 279/46 |
| 2,430,603 | 11/1947 | DeGood | 192/79 |
| 2,985,456 | 5/1961 | Stoner | 279/51 |
| 3,022,082 | 2/1962 | Haviland | 279/1 |
| 3,136,561 | 6/1964 | McAuliffe et al. | 279/46.7 X |
| 3,529,841 | 9/1970 | Hall | 279/6 |
| 4,097,179 | 6/1978 | Gersch | 408/151 |
| 4,677,885 | 7/1987 | Schmid et al. | 82/40 R |
| 4,989,887 | 2/1991 | Jordan | 279/48 |
| 5,193,825 | 3/1993 | Kanaan et al. | 279/48 X |

Primary Examiner—Steven C. Bishop
Attorney, Agent, or Firm—Dority & Manning

[57] ABSTRACT

The center of a collet having a plurality of individual gripper members resiliently spaced apart in an annular array and operated on by a frustoconical surface can be adjusted by displacing some of the gripper members more than others of the gripper members parallel to the axis with which both the annular array and the frustoconical surface are nominally concentric. This causes the frustoconical surface to produce greater radial displacement of some of the gripper members, thereby shifting the center of the collet transverse to the above-mentioned axis. An element transversely moveable relative to the axis causes displacement of some of the gripper members more than others.

22 Claims, 2 Drawing Sheets

COLLET CHUCK APPARATUS

BACKGROUND OF THE INVENTION

The present application is a continuation application of U.S. application No. 770,355 filed on Oct. 3, 1991, now U.S. Pat. No. 5,193,825.

This invention relates collet chucks—toolholders and workholders having collets—and more particularly to collet chucks of the type including a plurality of substantially rigid gripper members in an annular array, the gripper members being angularly or circumferentially spaced apart in said array by resilient members or resilient means. The present invention is widely applicable to toolholders and workholders which grasp any round or faceted tool shank or workpiece, for example, drill bits, end mills, reamers, and taps.

It would frequently be advantageous to be able to adjust the location of the center of toolholder or workholder transverse to the axis with which the collet is nominally concentric. Such adjustment would make it possible to compensate of runout—a lack of concentricity of the tool or object within the toolholder or workholder, caused by minor imperfections in the collet and/or in the object being gripped by the collet.

It is therefore an object of this invention to provide improved toolholders and workholders having collets which minimize runout where high accuracy is required.

It is a more particular object of this invention to provide toolholders and workholders having collets in which the center of the toolholder or workholder can be shifted transverse to the axis with which the collet is nominally concentric without a need for repetitive chucking and unchucking of the object or tool to attain the required adjustment.

SUMMARY OF THE INVENTION

These and other objects of the invention are accomplished in accordance with the principles of the invention by modifying a toolholder or workholder using a collet of the type (shown, for example, in Stoner U.S. Pat. No. 2,346,706 and Haviland U.S. Pat. No. 3,022,082) having a plurality of individual gripper members spaced apart from one another in an annular array by resilient material. The circumferential spacing of the gripper members in such devices is changed by forcing the gripper members against a frustoconical surface in a direction substantially parallel to the longitudinal axis of the device. The modification of such a toolholder or workholder by adding means for allowing some of the gripper members to be displaced relative to others of said gripper members parallel to said longitudinal axis, thus causes the center of the collet to shift transversely relative to said longitudinal axis. A device of this type is shown in Jordan U.S. Pat. No. 4,989,887. The present invention provides improved structure for obtaining relative displacement of the gripper members. In particular, the present apparatus provides greater accessibility to the adjustment means than is available in presently known devices.

Further features of the invention, its nature and various advantages will be more apparent from the accompanying drawings and the following detailed description of the preferred embodiments.

DETAILED DESCRIPTION OF THE PREFERRED EMBODIMENTS

The present invention has wide applicability to toolholders and workholders having collets, also known as collet chucks. The illustrative embodiments hereinafter described present the mechanism of the present invention as applied to toolholders. It is to be understood, of course, that the mechanism easily can be applied in a workholder or other type of collet chuck.

Figure 1:
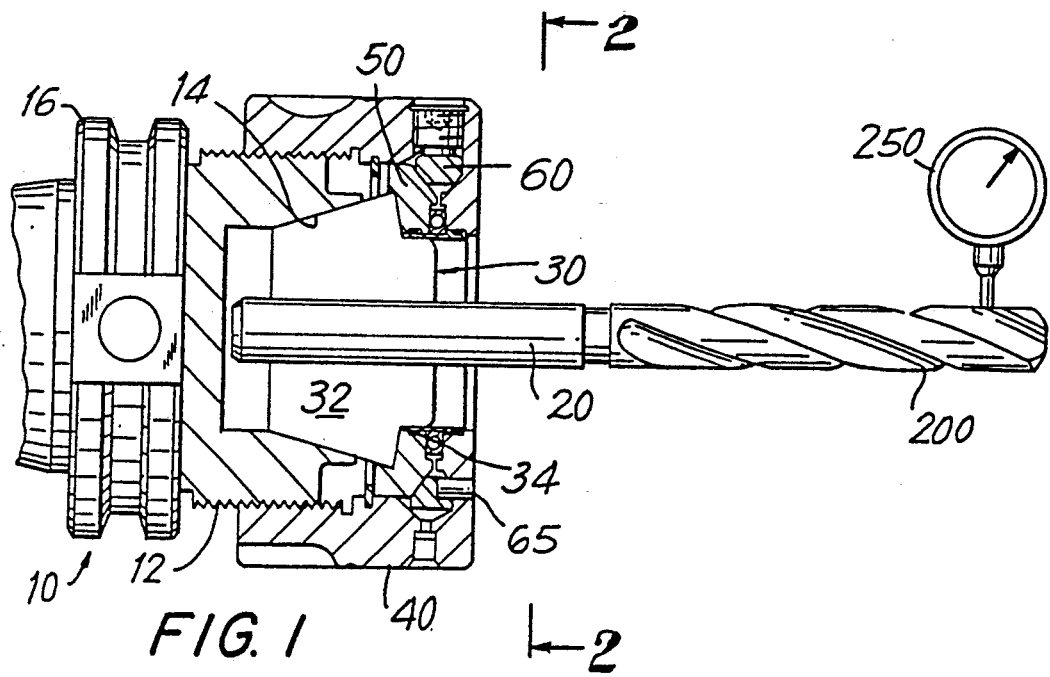
FIG. 1 is a simplified longitudinal sectional view of an illustrative toolholder constructed in accordance with this invention, in which the collet grips a representative tool.
Figure 3:
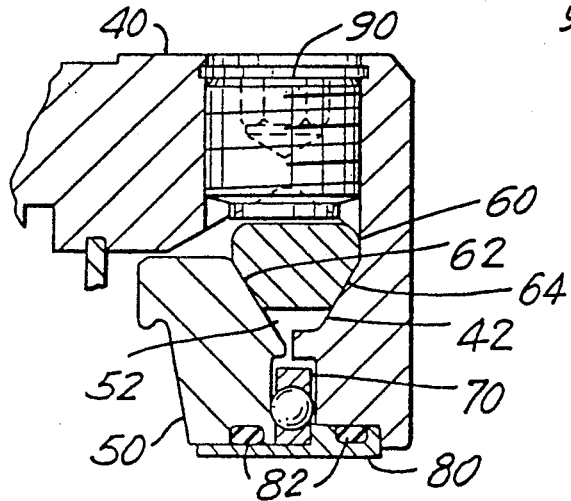
FIG. 3 is a fragmentary view of FIG. 1 showing a detailed mechanism constructed in accordance with this invention.

As shown in FIGS. 1 and 3 a toolholder 10 constructed in accordance with this invention includes a body 12 having a frustoconical inner surface 14. Toolholder 10 is typically mounted on an arbor or shaft 16 so that the toolholder can be rotated about its central longitudinal axis 20 by rotation of arbor 16 about that axis.

Inside body 12 is a collet having an annular structure 30 which is nominally concentric with axis 20 and which includes a plurality of individual metal gripper members 32 angularly spaced apart from one another by a resilient material (e.g., a rubber or plastic material). Although other techniques can be used for providing annular structure 30, in the preferred embodiment each of gripper members 32 is a substantially flat, blade-like member disposed in a plane which includes and extends radially out from axis 20. Members 32 are embedded in an annulus of rubber material, and may have two or more holes in each member 32 so that the rubber material can pass through those holes in order to help hold members 32 in place in the rubber annulus. The proximally located outer surfaces of members 32 are inclined to mate with frustoconical surface 14, while the distally located outer surfaces of members 32 have indents 34 to hear against thrush washer 50 as hereinafter described. The outer surface of body 12 is threaded to receive nut 40 which is also nominally concentric with axis 20.

Figure 2:
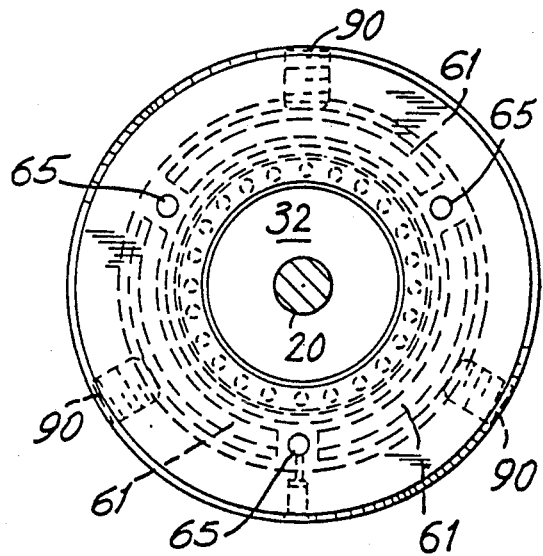
FIG. 2 is an axial end view (taken along the line 2—2 in FIG. 1) of a portion of the toolholder of FIG. 1.

In a first embodiment of the mechanism of the present invention, segmented ring 60 comprises a plurality of equal-arc circumferential segments 61, and is disposed inside toolholder 10 between nut 40 and the distal end of thrust bearing 50 so that its segments 61 are nominally concentric with axis 20. Segmented ring 60 has proximal and distal frustoconical surfaces 62 and 64, respectively, inclined to mate with frustoconical distal surface 52 of thrust washer 50 and frustoconical proximal surface 42 of nut 40. As shown in FIG. 2, steel dowel pins 65 are positioned parallel to axis 20 between segments 61 of segmented ring 60 to maintain the circumferential spacing of segments 61. Accordingly, each segment 61 of segmented ring 60 is transversely moveable relative to axis 20 independently of the other segments, as hereinafter described.

Thrust bearing 70 is disposed between thrust washer 50 and the proximal surface of nut 40 at a position concentric with central longitudinal axis 20. Seal retainer 80 comprises an annular sleeve positioned concentrically within nut 40 and thrust washer 50, so that, in cooperation with sealing rings 82, seal retainer 80 bridges thrust bearing 70, thereby preventing swarf (cuttings and foreign matter mixed with lubricant) from entering between thrust washer 50 and nut 40. In a preferred embodiment seal retainer 80 is fixed to nut 40 so that thrust washer 50 slides freely over seal retainer 80 as thrust washer 50 is moved in the proximal or distal directions.

To install tool 200 in toolholder 10, nut 40 is first removed from body 12. A collet having a diameter suitable for the tool shank to be gripped is placed within the cavity of body 12 and nut 40 reinstalled loosely on body 12. The shank of tool 200 is then inserted through the aperture in nut 40 and engaged by the gripping members 32 of the collet. When nut 40 is further tightened on body 12, nut 40 forces segmented ring 60 against thrust bearing 50 and indents 34 of annular structure 30. This action forces annular structure 30 against frustoconical surface 14, annularly compressing annular structure 30 and causing it to grip tool 200. Thus, as annular structure 30 is forced proximally relative to body 12, frustoconical surface 14 forces gripper members 32 radially inward into gripping engagement with tool 200. The surrounding resilient material yields to allow the circumferential spacing between gripper members 32 to decrease.

After toolholder 10 has been tightened on tool 200 as described above, the set-up may be tested for concentricity with axis 20. This may be accomplished, for example, by placing the actuator of a dial-type displacement indicator 250 in contact with the peripheral surface of tool 200 and rotating toolholder 10. If the set-up is concentric with axis 20, the pointer of indicator 250 will remain relatively stationary. On the other hand, if the set-up is not concentric, the pointer of indicator 250 will oscillate as the toolholder is rotated. Concentricity can then be achieved by adjusting the collet in accordance with this invention as will now be explained.

A plurality of set screws 90 is provided in nut 40 so that each set screw extends through the nut substantially traverse to axis 20 and bears on a respective segment 61 of segmented ring 60. Set screws 90 are distributed around nut 40 in an annular array. In a first embodiment, segmented ring 60 comprises three segments 61, and three set screws are positioned 120° apart around the circumference of nut 40 so that the set screws bear on the mid-arc point of each segment 61, as shown in FIG. 2. Accordingly, segments 61 of segmented ring 60 can be individually positioned eccentrically relative to axis 20 by tightening some of set screws 90 more than others. Eccentric positioning of segmented ring 60 relative to axis 20 causes thrust washer 50 to become cocked or inclined relative to a plane perpendicular to axis 20. Cocking of thrust washer 50 distorts annular structure 30, axially displacing some of gripper members 32 more than others of the gripper members along frustoconical surface 14. This in turn causes frustoconical surface 14 to force those gripper members 32 having the greater axial displacement farther inward toward axis 20 than the gripper members on the other side of the collet which have lesser axial displacement. The resulting displacement of gripper members 32 causes the center of the collet to shift transversely, thereby adjusting the concentricity of the collet and tool 200. This adjustment can be made in any radial direction of toolholder 10 by adjustment of the appropriate ones of set screws 90 and therefore, transverse movement relative to axis 20 of segments 61 of segmented ring 60.

Removal of object or tool 200 from toolholder 10 upon completion of a desired task is performed by following a reverse procedure. Specifically, set screws 90 are first backed off to remove the transverse forces on segments 61 of segmented ring 60, so that segments 61 may return to a nominally concentric location when nut 40 is loosened from its threaded engagement with body member 12.

An important advantage of the present invention is the radial placement of set screws 90 substantially transverse to axis 20, so that they are more easily accessible than in previously know devices. In particular, whereas object or tool 200 may obstruct access to the centering adjustment means in previously known devices, thereby requiring removal and rechucking of the tool or object between concentricity measurements and adjustment of the adjusting means, the present invention permits easy adjustment of set screws 90 without the need to remove and rechuck object or tool 200.

Figure 4:
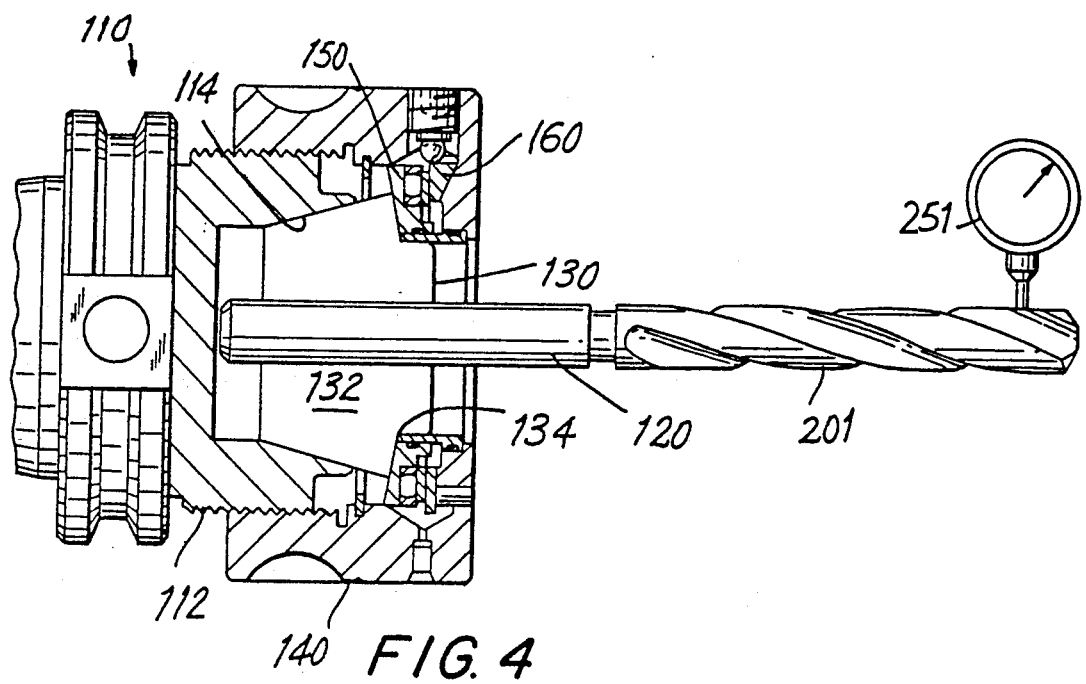
FIG. 4 is a simplified longitudinal sectional view of an illustrative toolholder constructed in accordance with a second embodiment of this invention, in which the collet grips a representative tool.
Figure 5:
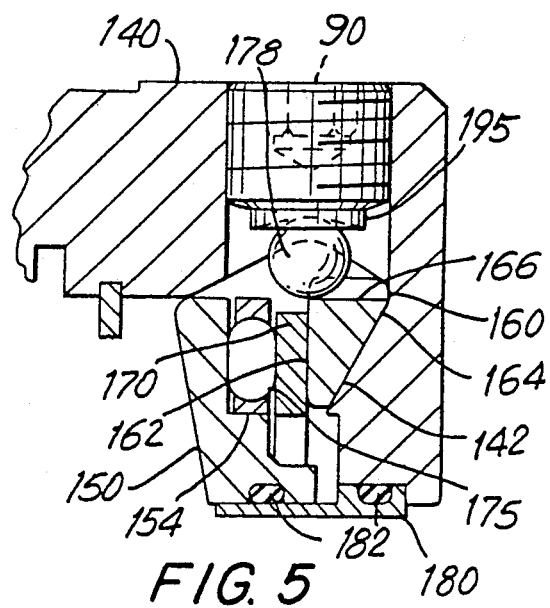
FIG. 5 is a fragmentary view of FIG. 4 showing a second detailed mechanism constructed in accordance with this invention.

A second embodiment of an illustrative toolholder 110 constructed in accordance with the present invention is shown in FIGS. 4 and 5. In FIGS. 4 and 5, toolholder 110 includes a body 112 having a frustoconical inner surface 114. As in the first embodiment, annular structure 130 is installed within body 112 nominally concentric with axis 120 and includes a plurality of individual metal gripper members 132 angularly spaced apart from one another by a resilient material.

The proximally located outer surfaces of members 132 are inclined to mate with frustoconical surface 114, while the distally located outer surfaces of members 132 have indents 134 that bear against thrust washer 150 as hereinafter described. The outer surface of body 112 is threaded to receive nut 140 which is also nominally concentric with axis 120.

Segmented ring 160 comprises a plurality of equal-arc circumferential segments 161, and is disposed inside toolholder 110 between nut 140 and the distal end of thrust bearing 150 so that its segments 161 are nominally concentric with axis 120. Proximal surface 162 of segmented ring 160 bears against washer 170, while distal frustoconical surface 164 is inclined to mate with frustoconical proximal surface 142 of nut 140. As in the first illustrative embodiment, steel dowel pins 165 (not shown) are positioned parallel to axis 120 between segments 161 of segmented ring 160 to maintain the circumferential spacing of segments 161. Thus, each segment 161 of segmented ring 160 is transversely moveable relative to axis 120 independently of the other segments.

Segmented ring 160 has reduced diameter portion 154 on its distal surface. Bearing 175, which may be a needle type bearing (one having ovoid rather than spherical bearing balls) is disposed concentrically on reduced-diameter portion 154 of thrust washer 150. Washer 170 is interposed between the distal face of bearing 175 and the proximal face of segmented ring 160, so that the balls of bearing 175 do not fall into the gaps between segments 161 of segmented ring 160.

Each segment 161 of segmented ring 160 has a notch or groove 166 in its radially outwardly disposed face for seating steel ball 178 therein. Steel ball 178 serves to reduce the friction between each segment 161 and its corresponding set screw 190, hereinafter described. Notch 166 is arranged so that steel ball 178 can roll or slide along the notch as segment 161 is advanced or retracted along inclined surface 142 by the movement of set screw 190.

Seal retainer 180 comprises an annular sleeve positioned concentrically within nut 140 and thrust washer 150, so that, in cooperation with sealing rings 182, seal retainer 180 bridges the gap between thrust washer 150 and nut 140 to prevent swarf from entering between thrust washer 150 and nut 140. Seal retainer 180 may be fixed to nut 140 so that thrust washer 150 slides freely over seal retainer 180 as thrust washer 150 is moved in the proximal or distal directions.

A plurality of set screws 190 is provided in nut 140 so that each set screw extends through the nut substantially traverse to axis 120 and bears on a steel ball 178 associated with a respective segment 161 of segmented ring 160. Set screws 190 have a hardened insert 195 which bears against its associated steel ball 178, so that the material of the set screw will not yield after contacting ball 178.

Set screws 190 may be distributed around nut 140 in an annular array in the same fashion as described for the first illustrative embodiment of the invention. Where segmented ring 160 comprises three segments 161, the three set screws are positioned 120° apart around the circumference of nut 140 so that the ball 178 associated with each set screw bears on the mid-arc point of its respective segment 161. Segments 161 of segmented ring 160 can be therefore individually positioned eccentrically relative to axis 120 by tightening some of set screws 190 more than others, causing the relative displacement of the gripper members 132 of annular structure 130 as hereinbefore described with respect to the first embodiment.

Operation of the second illustrative embodiment of the present invention is also similar to that described for the first toolholder embodiment. Nut 140 is first removed from body 112. A collet having a diameter suitable for the tool shank to be gripped is placed within the cavity of body 112 and nut 140 reinstalled loosely on body 112. The shank of tool 201 is then inserted through the aperture in nut 140 and engaged by the gripping members 132 of the collet. When nut 140 is further tightened on body 112, nut 140 forces thrust bearing 150 into contact with indents 134 of annular structure 130 via segmented ring 160, washer 170 and bearing 175. This action forces annular structure 130 against frustoconical surface 114, annularly compressing annular structure 130 and causing it to grip tool 201. Adjustment of the concentricity of the tool or workpiece 201 in toolholder 110 is then achieved by selectively tightening or loosening set screws 190, in conjunction with measurements taken with displacement indicator 251.

Removal of object or tool 201 from toolholder 10 upon completion of a desired task is performed by following a reverse procedure. Set screws 190 are first backed off to remove the transverse forces on segments 161 of segmented ring 160, so that segments 161 may return to a nominally concentric location when nut 140 is loosened from its threaded engagement with body member 112.

It will be apparent that the foregoing embodiments are merely illustrative of the principles of this invention, and that various modifications can be made by those skilled in the art without departing from the scope and spirit of the invention. For example, it may be preferably to start out with all of set screws backed out somewhat, so that when an adjustment is necessary after the toolholder has been tightened on object or tool, the adjustment can be achieved by tightening selected set screws, thereby shifting the center of toolholder transversely while maintaining approximately constant gripping force on object or tool. As another example, the set screws can have any of a wide range of angles of inclination or orientation transverse to the axis of the toolholder of workpiece as an alternative to being substantially perpendicular to that axis as shown in the depicted embodiments.

What is claimed is:

1. A collet chuck for use with a machine collet of the type having a pluraity of rigid gripper members disposed in an annular array and circumferentially spaced from one another by resilient means, said chuck comprising:

a body member having a frustoconical surface defined therein substantially concentric with said body member, said frustoconical surface for receiving a machine collet;

means moveable relative to said body member for forcing a collet disposed within said body member against said frustoconical surface along a line substantially parallel to an axis concentric with said frustoconical surface, so that the gripper members of a collet disposed within said body are forced against said frustoconical surface thereby changing the circumferential spacing between the gripper members; and means transversely moveable relative to said axis for displacing at least one gripper member of a collet disposed within said body member along said frustoconical surface in a direction generally parallel to said centerline axis in order to shift the center of the collet in a direction transverse to said centerline axis.

2. The collet chuck as in claim 1, further comprising an annular member substantially concentric with said axis and disposed so as to contact a collet within said body member in opposition to said frustoconical surface, said means transversely moveable relative to said axis acting upon said annular member to incline said annular member relative to a plane perpendicular to said axis.

3. The collet chuck as in claim 2, wherein said means for forcing comprises a nut member concentric with said axis and threadedly engaged with said body member, and wehrein said means transversely moveable relative to said axis inclines said annular member relative to said nut member.

4. The collet chuck as in claim 3, wherein said nut member is removable from said body member.

5. The collet chuck as in claim 3, wherein said means transversely moveable relative to said axis comprises an element interposed between said annular member and said nut member so that transverse movement of sid element causes said annular member to become inclined relative to a plane perpendicular to said axis.

6. The collet chuck as in claim 5, wherein said element comprises a circumferential segment of an annulus, said segment located nominally concentric with said axis.

7. The collet chuck as in claim 5, further comprising adjusting means for moving said element transversely relative to said axis.

8. The collet chuck as in claim 7, wherein said adjusting means comprises at least one set screw extending through said nut member transverse to said axis and acting on said element.

9. The collet chuck as in cliam 8, further comprising a ball interposed in force transmitting relation between said set screw and said element.

10. The collet chuck as in claim 8, wherein said set scfrew extends through said nut member substantially radial to said axis.

11. The collet chuck as in claim 9, wherein said set screw extends through said nut member substantially radial to said axis.

12. The collet chuck as in claim 5, further comprising a bearing interposed between said annular member and said nut member.

13. The collet chuck as in claim 5, furhther comprising a bearing interposed between said annular member and said element.

14. The collet chuck as in claim 3, further comprising seal means, wherein said seal means comprises a tubular sleeve having proximal and distal ends disposed concentric to said axis, said tubular sleeve having its proximal end slideably disposed in said nut member so as to prevent swarf from accumulating between said annular member and said nut member.

15. A tool holding device for holding a collet and associated tool in precise axial alignment, said tool holding device comprising:
a body member having a frustoconical surface substantially concentric with the centerline axis through said body member;
a nut member threadedly engaged with said body member for forcing a collet within said body member against said frustoconical surface substantially parallel said axis so that said frustoconical surface uniformly compresses the collet along sid frustoconical surface; and
means for displacing a portion of a collet forced against said frustoconical surface in a direction generally parallel to said axis in order to shift the center of the collet in a direction transverse to said axis, wherein said means for displacing comprises an annular member substantially concentric with said axis and disposed so as to contact a collet in opposition to said frustoconical surface, an annular segment nominally concentric with said axis and interposed between said annular member and said nut member, and at least one set screw extending through said nut member transverse to said axis and acting on said annular segment, so that adjustment of said set screw disposes said annular segment eccentrically relative to said axis and causes said annular member to become inclined relative to a plane perpendicular to said axis.

16. The evice as in claim 15, wherein said set screw extends through said nut mebmer substantially perpendicular to said axis.

17. The device as in claim 15, further comprising a ball interposed in force transmitting relation between said set screw and said annular segment.

18. The device as in claim 17, wherein a hardened insert is mounted on said set screw where said set screw contacts said ball.

19. The device as in claim 15, further comprising a bearing disposed inwardly of said annular segment and concentrically with said axis, said bearing interposed between said annular member and said nut member for transmitting force from said nut member through said annular member to said annular array.

20. The device as in claim 15, further comprising a bearing concentrically interposed between said annular member and said annular segment for transmitting force from said nut member to said annular array.

21. The device as in claim 15, further comprising seal means, wherein said seal means comprises a tubular sleeve having proximal and distal ends and disposed concentric to said axis, said tubular sleeve having its proximal end slideably disposed in said annular member and its distal end disposed in said nut member so as to prevent swarf from accumulating in between said annular member and said nut member.

22. The device as in claim 15, wherein said nut member is removable from said body member.

* * * * *